Nov. 10, 1964 G. M. BALTZ 3,156,074
PROCESS AND APPARATUS FOR GRINDING A SHELL MILLING CUTTER
Filed Aug. 7, 1961 5 Sheets-Sheet 1

INVENTOR.
GEORGE M. BALTZ
BY
Reynolds + Christensen
ATTORNEYS

INVENTOR.
GEORGE M. BALTZ

INVENTOR.
GEORGE M. BALTZ
BY Reynolds +
Christensen
ATTORNEYS

INVENTOR.
GEORGE M. BALTZ
BY
Reynolds & Christensen
ATTORNEYS

Nov. 10, 1964  G. M. BALTZ  3,156,074
PROCESS AND APPARATUS FOR GRINDING A SHELL MILLING CUTTER
Filed Aug. 7, 1961  5 Sheets-Sheet 5

INVENTOR.
GEORGE M. BALTZ
BY
Reynolds + Christensen
ATTORNEYS

United States Patent Office 3,156,074
Patented Nov. 10, 1964

3,156,074
PROCESS AND APPARATUS FOR GRINDING A SHELL MILLING CUTTER
George M. Baltz, P.O. Box 1142, Yakima, Wash.
Filed Aug. 7, 1961, Ser. No. 129,765
16 Claims. (Cl. 51—122)

This invention relates to the machine-finishing of work surfaces, and in particular, surfaces that meet at an angle and that are joined by a curve or fillet at some given radius. More especially, this invention concerns the grinding of the teeth of a cutter in one operation and without change in the set-up of the grinder, so that the cutter wheel may finish two angularly related surfaces and the fillet between them in one smooth operation. In a broader sense, however, the invention concerns the grinding of cutter teeth to afford them the correct or desired clearance angle, and a smooth, and accurate edge.

It is the primary object of this invention to provide a method for grinding the teeth of a cutter wheel accurately, and in a manner to insure automatically that such teeth are given the correct clearance angle, and if the cutter wheel is to cut the fillet between two angularly related surfaces, in a manner to insure that the side-cutting teeth and the end-cutting teeth each have the correct clearance angle and that the junction of such teeth is curved at the correct radius and clearance, and merges smoothly into each of the side face cutting teeth and the end face cutting teeth, to produce the desired fillet, all in a single operation.

It is a further object of this invention to provide a mechanism for carrying out the method of this invention, as outlined above.

Further objects, and especially such as pertain to details of the method and of the mechanism, will appear more fully hereinafter.

The drawings illustrate a preferred form of mechanism as used in carrying out the sequence of operations according to the method.

In order to carry out the primary object of this invention, a cutter wheel must be ground in a particular manner. To do this, the cutter wheel is mounted upon an arbor which is rotatable and axially movable by hand, and a motor-driven grinder wheel of a special nature is mounted in a particular relation to the locus of the cutter wheel. The grinder wheel has a slightly conical end face which does the grinding and its axis is tilted to produce correct clearance. The axial movement of the cutter wheel to be ground affords traversing movement of its several side-face cutting teeth past a point of contact with the grinder wheel's end face, and its rotative movement presents successive teeth to the grinder wheel. The cutter wheel is also mounted for swinging about an axis that coincides with the center of the radius that corresponds to the radius of the fillet to be cut. Thereby, after traversing movement of the cutter wheel past the grinder wheel to sharpen a given side-face cutting tooth, the cutter wheel is swung about the axis mentioned, to sharpen the corner of the tooth to the required radius and with the same clearance. Finally, upon completing the corner, the cutter wheel reaches a position where the grinder wheel engages and plunge grinds the end-face cutting tooth which corresponds to the side-face cutting tooth that was sharpened. Its clearance is the same, since it is oriented in the same manner to the grinder wheel's end face as was the side-face cutting tooth. The shallow conical shape of the end face of the grinder wheel assures contact at a point or line of the teeth. This conical shape somewhat alters the clearance angle, but is taken into account in determining the tilt angle of the axis of the grinder wheel. The relationship of these parameters will appear more fully hereinafter.

Figure 9:
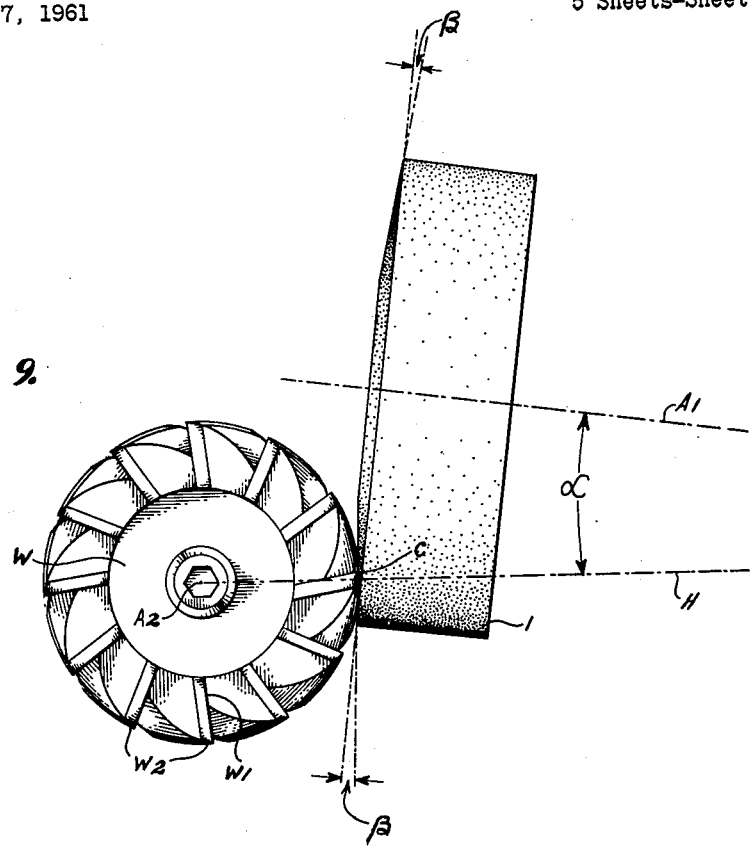
FIGURE 9 is an enlarged side elevational view to illustrate the positional and angular relationships of the grinding wheel and cutter, with parts in the positions corresponding to FIGURE 6.

The grinder wheel 1, upon a rotative shaft 10, is supported in a mount 11, and can be swung bodily about an axis 12 which is fixed relative to the column or machine frame F. The axis A1 of shaft 10 and grinder wheel 1 is not horizontal, but inclined as FIGURE 9 shows best, at a small angle $\alpha$, say 7°, to the horizontal, represented by line H. This angle $\alpha$ is approximately that of the desired clearance angle of the teeth, but is in excess of such clearance angle. The end face 14 of the grinder wheel 1, where all grinding occurs, is conically related to a plane perpendicular to axis A1, but at a very small angle $\beta$, say 1°. As will appear more fully hereinafter, the difference between angles $\alpha$ and $\beta$ is the clearance angle—in the example chosen, 6°. The effect and purpose of these dispositions and arrangements will appear more fully hereinafter.

The cutter wheel W may have either straight or helical side-face cutting teeth W2; the process and the apparatus function correctly on either type. The end-face cutting teeth W1 are complemental to, and continuations of, the respective teeth W2. The wheel W is carried by a mount which is adjustable along a line extending in the same general direction as axis A1, and also transversely with respect thereto. This mount is also adjustable vertically relative to the axis A1, the purpose being to locate the horizontal line H through the point of contact C between the grinder wheel and a tooth in a horizontal diametral plane through wheel W. For example, a journal 20 mounts an arbor 21 for rotation by hand about its axis A2, and for axial movement. The cutter wheel W during its grinding is fixed to an end of the arbor 21, the opposite end whereof carries a hand wheel 22. The journal base 23 is fixed in a given position upon grooved plate or table 24, and the latter is guided at 25a upon a table 25 for rectilinear movement by the adjusting mechanism 25b. Table 25 is guided at 26a upon a plate or table 26 for movement at right angles to guide 25a, by the adjusting mechanism 26b. The table 26 is rotatively mounted about the axis V, with respect to slide 27, which latter is guided at 28a for bodily movement of the entire arbor mount, by the adjusting mechanism 27b, relative to subbase 28. Also the subbase 28, that carries the guide 28a, is vertically adjustable at 13 relative to the machine frame, or column F. Adjusting mechanism 25b moves the wheel W upon its arbor in the direction of axis A2, and adjusting mechanism 26b moves wheel W transversely to its axis A2. Rotation about the vertical axis V would normally be limited by stops interengageable between 26 and 27, but not shown, or index marks can show the required limits of rotational movement, usually 90° apart.

By the arrangement described, or other suitable arrangement, the axis A2 may be brought to the same level as the line H through the point of contact C (see FIGURE 9) of a tooth with the end face 14 of the grinder wheel 1, and the cutter wheel W may be moved, as described later, into correct position towards and from the grinder wheel, along the line H, and transversely thereof. The cutter wheel W is also adjustable vertically relative to grinder wheel, in order to bring the horizontal diametral plane through wheel W and the line H into registry.

Figure 1:
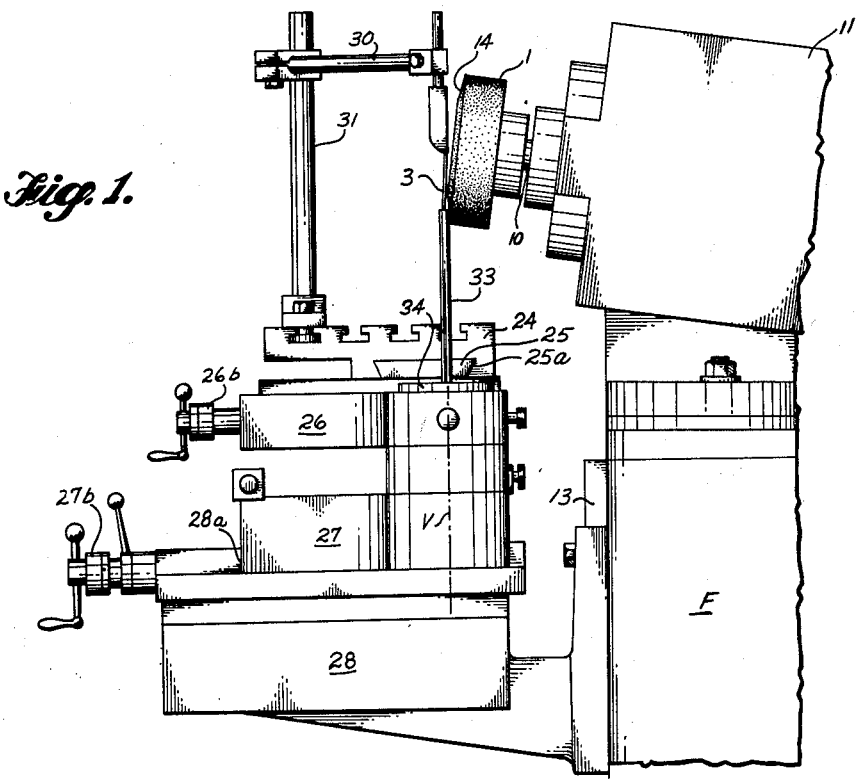
FIGURE 1 is a side elevational view from the side opposite the operator, illustrating a first step in the method, having to do with setting up for grinding.

The first step in the method (see FIGURE 1) is to locate the tip of a contact finger 3 substantially in the line H, slightly offset from the point of contact C. The purpose of this contact finger is to engage a tooth W2 of the cutting wheel W and by pressure of the tooth against the finger 3 to insure that the tooth is always and throughout its length presented at the correct clearance angle to the grinder wheel 1 at the point of contact C. The finger 3 is carried by a horizontal arm 30, and can be vertically adjusted relative to that arm; see FIGURE 1. The arm 30 is mounted upon a post 31, and the post 31 rises from a base slidable along plate 24. Provision is made in one or more of these connections for rotation of arm 30 about the axis of post 31; the arm 30 may be adjustable in the direction of its length, and vertically along the post 31. The mounting of the contact finger 3 allows it to be adjusted in all necessary directions, assures that it will remain fixed when finally adjusted, and removes its mount from the field of operation. The correct location of the tip of the contact finger 3 is simplified by the use of a post or height gauge 33 rising to the proper height from a base 34 that rests upon the plate 26 and which is nearly coaxial with the axis V. The tip of the finger 3 rests upon the upper end of height gauge 33, and then is fixed in position. The height gauge is then removed. During this first step the cutter wheel W is swung aside, or its mount is removed from plate 24.

Figure 2:
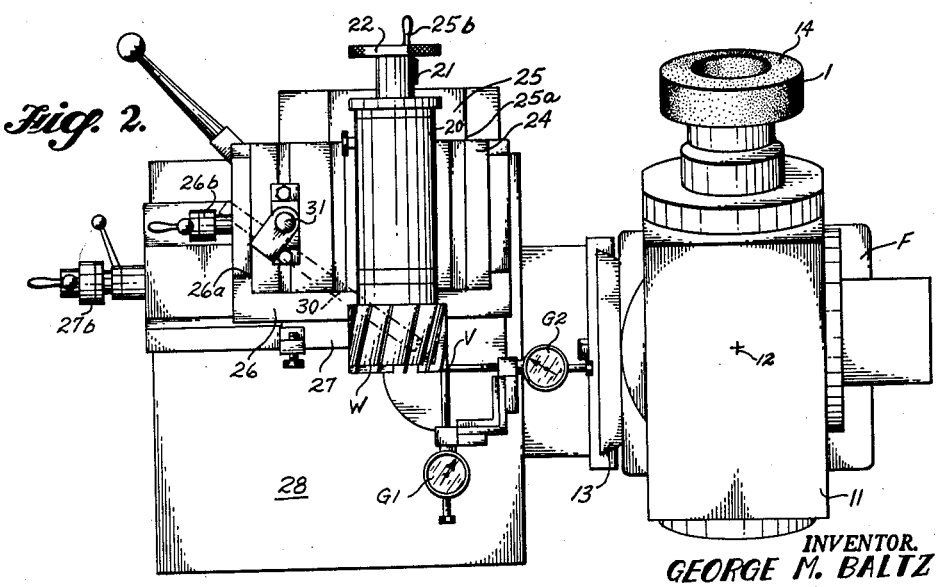
FIGURE 2 is a top plan view, illustrating the second step, also a setting up operation for the cutter to be ground.
Figure 11:
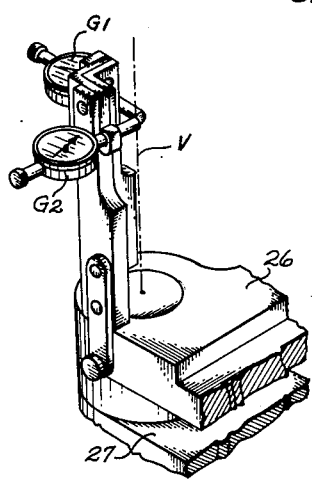
FIGURE 11 is an isometric detail of the contact gauges and their relationship to other parts of the machanism with parts in the position of FIGURE 2.
Figure 10:
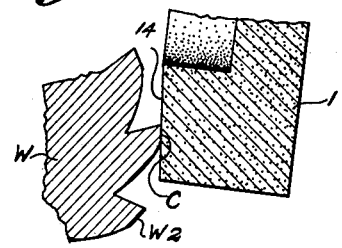
FIGURE 10 is a further enlarged view of the same, in section.

The next step is to locate the corner or angle between corresponding teeth W1 and W2, at the horizontal diametral plane, in alignment with axis V, or else at a given distance beyond that axis, corresponding to the radius of the desired fillet of the workpiece to be finished. Two contact gauges G1 and G2 are mounted upon the plate 25 (see FIGURE 11) at a level to contact the end face cutting teeth W1 and the corresponding side face cutting teeth W2, respectively, close to the angle between such teeth and in such diametral plane. The arbor 21 is moved to the limit position axially. The contact finger 3 engages the tooth W2, and holds the tooth at the proper level, that of the point of contact C. At this time the grinder wheel may be swung aside about axis 12, as it is shown in FIGURE 2. The wheel W, by rotation about axis V, is swung to the position that would present the side face cutting teeth W2 to the grinder wheel, were parts ready for grinding. Normally the wheel W is shifted by moving its mounts in the axial direction to deflect gauge G1 by the amount of the fillet's radius, and is moved transversely of its axis to deflect gauge G2 by the same amount. The mounts for wheel W are then fixed in position, leaving it free only to rotate about axis V, and to slide axially in its journal 20. The wheel W has now been properly set up, and is ready for the first grinding step, after removal of gauges G1 and G2.

Figure 3:
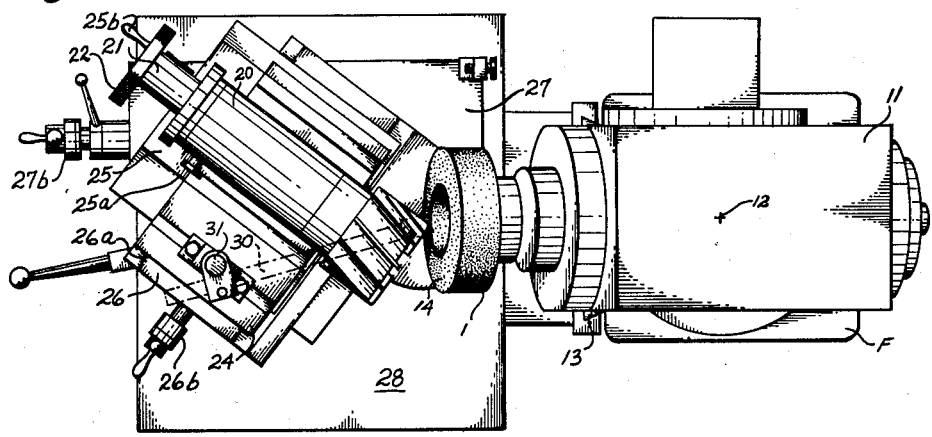
FIGURE 3 is a top plan view, and FIGURE 4 a side elevational view, illustrating the usual first rough grinding operation on the cutter wheel.
Figure 4:
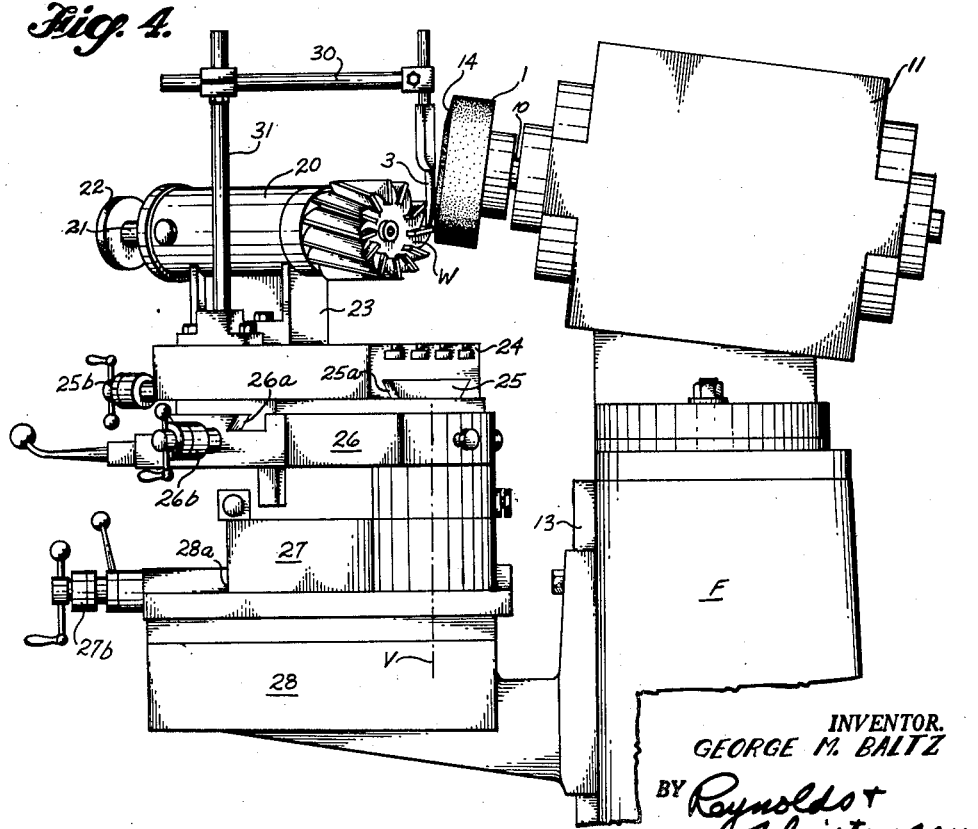

The first grinding step is shown in FIGURE 3, and consists of rough grinding the corner between teeth W1 and W2. It is done by rotating the grinder wheel 1 about axis 12 to its fixed working position, presenting the wheel W, with its journal 21 pulled fully out by the hand wheel 22, to the grinder wheel, at a corner between teeth W1 and W2, and then swinging the wheel W about axis V, with the contact finger 3 engaged with the teeth W1 and W2 being ground, just inside the point of contact C. Depending upon the length of the radius about this corner, it may be desirable to take a first rough cut and then a second finer cut, or the initial corner cut may be omitted, and the entire corner cut may be a part of the next operation.

Figure 5:
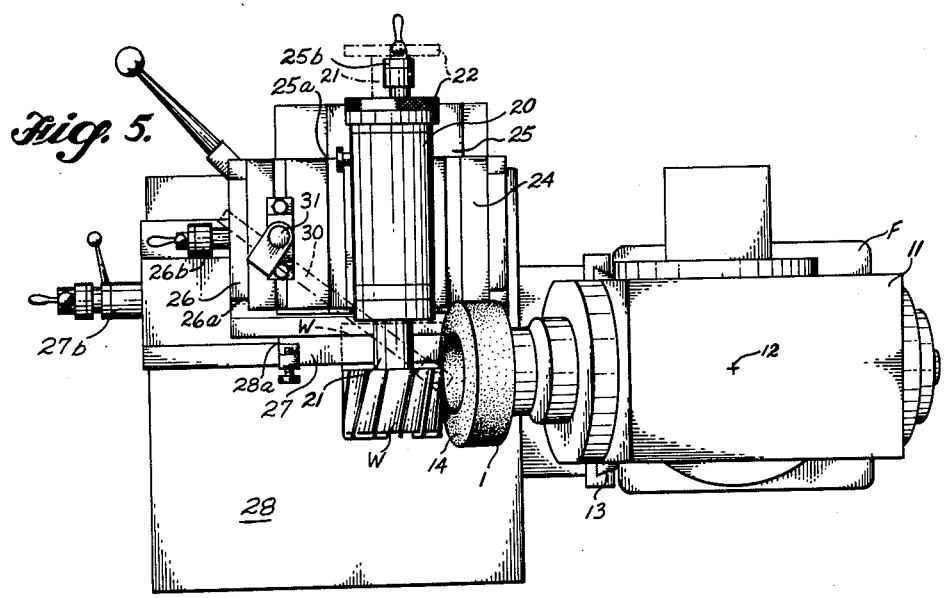
FIGURE 5 is a top plan view, and FIGURE 6 a side elevational view, of the grinding operation on the side-face cutting teeth.
Figure 6:
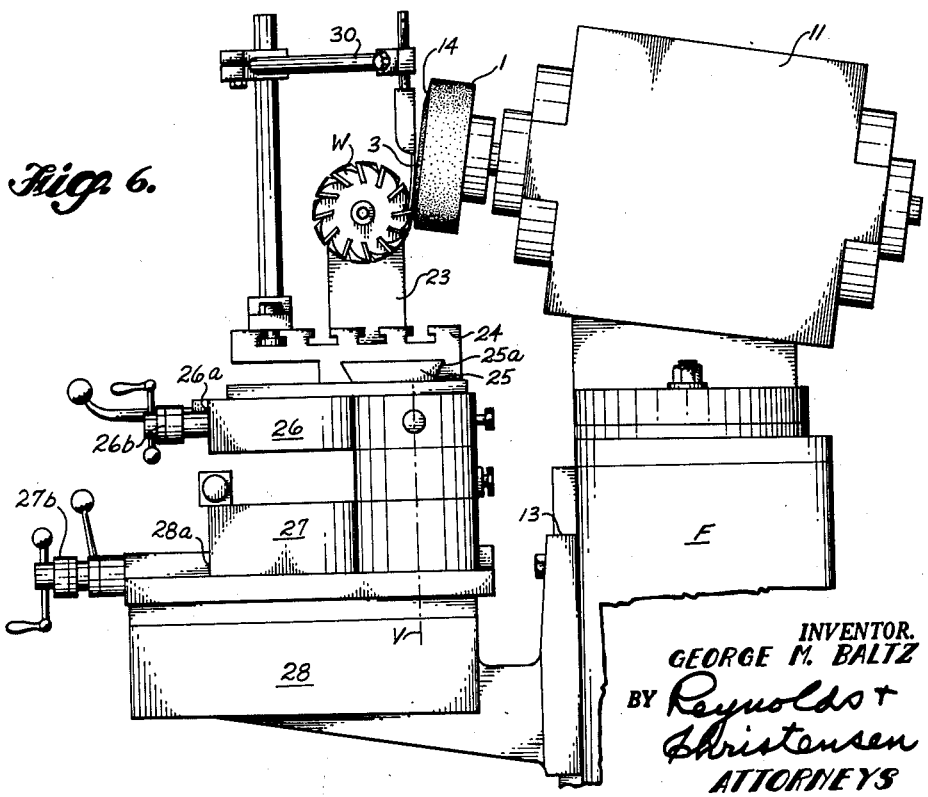
Figure 7:
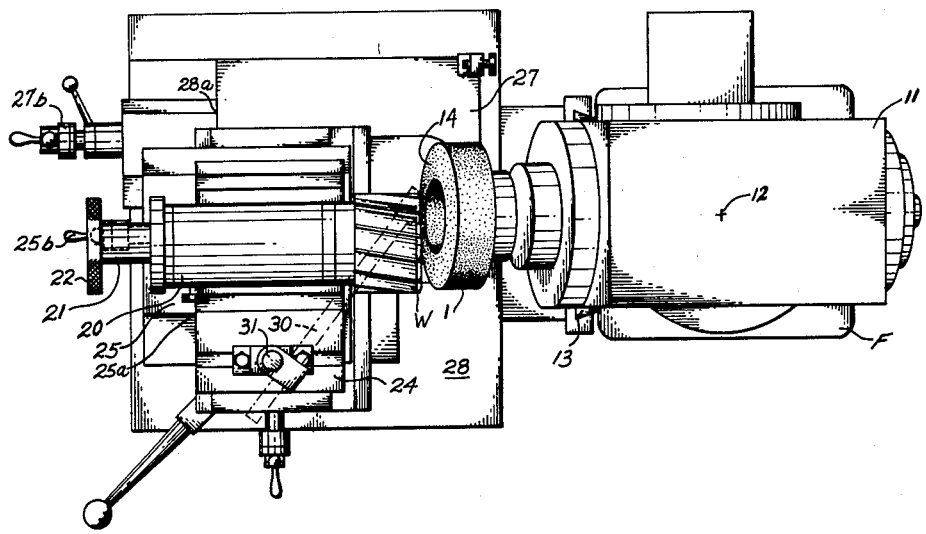
FIGURE 7 is a top plan view, and FIGURE 8 a side elevational view, of the grinding operation on the end-face cutting teeth.
Figure 8:
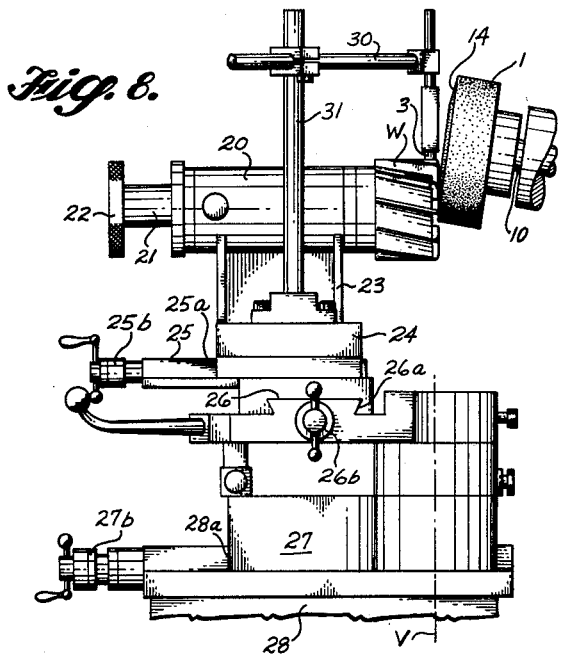

Now the wheel is ready for the grinding to sharpen and finish a side face cutting tooth W2, and the corresponding end face cutting tooth W1. The arbor 21 is pushed fully into its journal 20, and with the contact finger 3 always in contact with the tooth, and the end of the tooth W2 distant from the rounded (or to be rounded) corner presented to the point of contact C of the grinder wheel 1, as in FIGURES 5 and 6, the arbor 21 is gradually pulled back by hand wheel 22. This moves its cutting edge, previously offset relative to the point of contact C by the gauge G2, along the grinder wheel. Contact occurs only at point C for reasons that will appear shortly. The tooth's side face cutting edge is sharpened, and when the rounded corner is reached the mount for arbor 21 and wheel W is swung about the axis V, and the end face cutting tooth is engaged at point C, as is shown in FIGURES 7 and 8, and is plunge ground, without traverse. Thereby the side face cutting tooth, the end face cutting tooth, and the fillet cutting corner are all sharpened smoothly and accurately as parts of a single continuous operation.

Having sharpened one tooth W1, its corresponding tooth W2, and the corner where they meet, the wheel W is rotated by one tooth by hand wheel 22, and finger 3, which is resiliently flexible, engages the next tooth. This is ground in the same way, with no change in setting, and each tooth of wheel W is ground in turn. The final result is a cutting wheel which is uniformly ground in all its teeth, and capable of taking a smooth, uniform cut, without chattering, from two angularly related faces of the workpiece and the fillet joining them, all at one operation.

There remains to be explained the purpose and effect of the angular relationships of the grinder wheel's axis A1 and the horizontal line H through the point of contact C, and of the angle $\beta$, and why there is contact at a point C rather than along a chordal line including point C. Necessarily the teeth must be ground with a clearance behind their cutting edge. If axis A1 were parallel to, but above line H, and the end face 14 perpendicular to axis A1, this planar end face would engage a tooth being ground along a finite length, notwithstanding the helical twist of a tooth. This actual plane of contact, wherein the face of the grinder wheel moves generally arcuately, downwardly towards the tooth's edge at one side of a plane defined by the axes A1 and H, and upwardly away from the tooth's edge at the opposite side of that plane, receives minute scratches, as does the edge itself, and the edge is not accurately sharp, nor are the edges of all teeth alike. Tilting the axis A1 relative to line H would only aggravate these effects, and produce excessive clearance. Point contact with the tooth will prevent such results, but can not be obtained with a planar-faced grinder wheel, regardless of its attitude relative to the cutter wheel being ground.

In order to develop point contact two things are required according to this invention. The axis A1 is tilted at an angle $\alpha$ (say 7°) relative to line H, and the end face 14 is shallowly conical at the angle $\beta$ (say 1°) relative to a plane perpendicular to axis A1. Also, the point of contact C is in the line H, representing a horizontal plane including axis A2. Now it can be seen that the difference between the assumed values of angles $\alpha$ and $\beta$ produces a clearance angle of about 6°, and because the face 14 is conical the face is tangent to the tooth only at the point of contact C; as the face moves toward point C, and as it recedes therefrom, it is out of contact with the tooth. The contact is actually a single-line contact, advancing along the tooth as the arbor 21 is fed forwardly by hand. There are no arcuate scratches; the end face 14 does not move towards nor away from the tooth's cutting edge, but lengthwise thereof. As a result the tooth is smoothly and evenly sharpened, and all teeth alike. All grind marks run parallel to the tooth's edge, and the ground surface is better finished and the cutter has longer life. The pressure is light, since contact is along a line only, and not over a surface area.

Provision might be made for traverse of the grinder wheel 1 along the individual teeth W1 of the cutter wheel, as for example by guiding the mount 11 for such traversing movement transversely to axis A2 when the cutter wheel is in the position illustrated in FIGURES 7 and 8. This has been found unnecessary, however.

It will be appreciated that, so far as the method is concerned, it is immaterial whether the cutter wheel and the grinder wheel are supported by mechanism of the type described, or by other suitable mechanism, nor indeed whether the grinder wheel and the cutter wheel are manipulated by hand. The important things, so far as concerns the method, are that the grinder wheel be held at the angle $\alpha$, approximating the desired clearance angle, that its end face be shallowly conical at the angle $\beta$, to produce contact at a point only, and that the cutter wheel be traversable to move each side-face cutting tooth past the point of contact, and swingable at the correct radius inside the corner between side-face and end-face cutting teeth to cut the corner at this radius, with the same clearance, and to the extent necesary, to sharpen the end-face cutting teeth.

I claim as my invention:

1. In combination, a grinder wheel having a grinding annulus on one end face thereof, which annulus is disposed at a shallow conical angle to the rotational axis of the wheel, the grinder wheel being mounted so that its rotational axis is inclined to a horizontal plane through the annulus, and apparatus for mounting a cutter wheel adjacent the annulus for purposes of sharpening the cutting teeth thereon, which mounting apparatus enables the cutter wheel to be positioned so that its rotational axis lies in the horizontal plane and transverse to the rotational axis of the grinder wheel with the cutting edge of one of its side face cutting teeth in contact with the annulus over a line coincident with a vertical line through the grinder wheel axis, at least one of the grinder wheel and the mounting apparatus being movable in a direction lying in said plane and in a plane at right angles to the grinder wheel axis so as to effect relative traversal of the two wheels.

2. The combination according to claim 1 wherein the mounting apparatus also enables the cutter wheel to be turned about its axis, and further comprising guide means for progressively turning the cutting edge of a helically oriented side face cutting tooth on the cutter wheel into a horizontal locus across the line of contact as relative traversal is effected.

3. The combination according to claim 2 wherein the guide means includes a finger arranged in use to bear on the cutting tooth and move relatively along the length thereof as traversal is effected.

4. The combination according to claim 1 wherein the mounting apparatus is movable in a direction lying in said plane and in a plane at right angles to the grinder wheel axis so as to effect relative traversal of the two wheels.

5. The combination according to claim 4 wherein the mounting apparatus includes an arbor on one end of which the cutter wheel is mounted for the sharpening operation, which arbor is mounted for movement in both an axial and a rotational sense.

6. The combination according to claim 5 wherein the mounting apparatus includes a tubular casing in which the arbor is journaled and abutment means for limiting the extent of the axial movement of the arbor in the casing.

7. The combination according to claim 1 wherein at least one of the mounting apparatus and the grinder wheel is mounted for pivotal movement about a vertical axis.

8. The combination according to claim 7 wherein the mounting apparatus enables the cutter wheel to be moved in said plane along perpendiculars to the vertical axis so as to fix its position relative thereto.

9. The combination according to claim 8 wherein at least one of the mounting apparatus and the grinder wheel is movable along a horizontal line between the vertical axis and said vertical line to fix the relationship between the two.

10. The combination according to claim 9 wherein the mounting apparatus includes a stack of plates one of which is slidable along said horizontal line and the others of which are mounted on said one plate to slide along said perpendiculars to the vertical axis and to turn in unison thereabout.

11. The combination according to claim 8 further comprising gauge means having pressure responsive elements which are arranged in use on such perpendiculars to abut the vertical axis.

12. A method of sharpening the cutting teeth of a cutter wheel comprising positioning the cutter wheel adjacent a grinding annulus on one end face of a grinder wheel, which annulus is disposed at a shallow conical angle to the rotational axis of the grinder wheel, the grinder wheel being positioned so that its rotational axis is inclined to a horizontal plane through the annulus and the cutter wheel being positioned so that its rotational axis lies in the plane and transverse to the axis of the grinder wheel with the cutting edge of one of its side face cutting teeth in contact with the annulus over a line coincident with a vertical line through the grinder wheel axis, and moving at least one of the cutter and grinder wheels at right angles to the grinder wheel axis so as to effect relative traversal of the two wheels.

13. The method according to claim 12 further comprising turning the cutter wheel about its axis so as to progressively turn the cutting edge of a helically oriented side face cutting tooth thereon into a horizontal locus across the line of contact as relative traversal is effected.

14. The method according to claim 12 wherein the cutter wheel is moved at right angles to the grinder wheel axis so as to effect relative traversal of the two wheels.

15. The method according to claim 12 further comprising pivoting at least one of the cutter and grinder wheels about a predetermined vertical axis through the cutter wheel when relative traversal brings this vertical axis into a spacing from the aforementioned vertical line commensurate with the radius to be given the fillet between the side face cutting tooth and its complemental end face cutting tooth on the cutter wheel.

16. The method according to claim 12 further comprising adjusting the tilt of the grinder wheel axis relative to the plane so as to alter the clearance angle given the cutting edge.

References Cited in the file of this patent

UNITED STATES PATENTS

| | | |
|---|---|---|
| 1,917,504 | Curtis | July 11, 1933 |
| 2,332,420 | Wildhaber | Oct. 19, 1943 |
| 2,396,281 | Noble et al. | Mar. 12, 1946 |
| 2,421,358 | Sneva | May 27, 1947 |
| 2,803,929 | French | Aug. 27, 1957 |
| 2,858,649 | Scheubeck | Nov. 4, 1958 |
| 2,958,988 | Crosby | Nov. 8, 1960 |